United States Patent [19]

Harrington

[11] Patent Number: 5,471,639

[45] Date of Patent: Nov. 28, 1995

[54] APPARATUS FOR ARBITRATING FOR A HIGH SPEED DIRECT MEMORY ACCESS BUS

[75] Inventor: Gary L. Harrington, Wichita, Kans.

[73] Assignees: AT&T Global Information Solutions Company, Dayton, Ohio; Hyundai Electronics America, Milpitas, Calif.

[21] Appl. No.: 602,610

[22] Filed: Oct. 24, 1990

[51] Int. Cl.⁶ .................................................. G06F 13/28
[52] U.S. Cl. .................................................. 395/842
[58] Field of Search .................................. 364/200, 900; 370/85.1, 112; 395/425, 275

[56] References Cited

U.S. PATENT DOCUMENTS

| | | | |
|---|---|---|---|
| 4,042,811 | 8/1977 | Brunnett et al. | 364/413.19 |
| 4,067,059 | 1/1978 | Derchak | 395/425 |
| 4,131,944 | 12/1978 | Mager et al. | 395/275 |
| 4,309,754 | 1/1982 | Dinwiddie, Jr. | 395/325 |
| 4,313,160 | 1/1982 | Kaufman et al. | 395/275 |
| 4,354,225 | 10/1982 | Frieder et al. | 395/275 |
| 4,400,771 | 8/1983 | Suzuki et al. | 395/425 |
| 4,455,620 | 6/1984 | Watanabe et al. | 395/425 |
| 4,481,572 | 11/1984 | Ochsner | 395/325 |
| 4,519,028 | 5/1985 | Olsen et al. | 395/725 |
| 4,530,053 | 7/1985 | Kriz et al. | 395/275 |
| 4,751,634 | 6/1988 | Burrus, Jr. et al. | 395/275 |
| 4,783,730 | 11/1988 | Fischer | 395/275 |
| 4,786,847 | 11/1988 | Daggett et al. | 318/568.2 |
| 4,797,812 | 1/1989 | Kihara | 395/400 |
| 4,815,074 | 3/1989 | Jacobsen | 370/112 |
| 4,821,170 | 4/1989 | Bernick et al. | 395/275 |
| 4,827,409 | 5/1989 | Dickson | 395/250 |
| 4,916,692 | 4/1990 | Clarke et al. | 370/85.1 |
| 5,003,463 | 3/1991 | Coyle et al. | 395/275 |

*Primary Examiner*—Tod R. Swann
*Assistant Examiner*—James Peikari
*Attorney, Agent, or Firm*—James M. Stover; Jack R. Penrod

[57] ABSTRACT

A high speed direct memory access (DMA) sub-system of a microprocessor system provides data interfaces between a high speed peripheral bus, such as a small computer system interface (SCSI) bus, and a DMA random access memory (RAM) to provide the data bandwidth necessary to prevent a bottleneck to transfers through the high speed peripheral bus. To his end, the invention has a separate DMA bus and a separate DMA RAM over which high speed data transactions may be made at a very high speed using one or more DMA cycles. The DMA transactions are controlled by a high speed data controller. Primary control of the DMA sub-system is assigned to the DMA sub-system, but the microprocessor may arbitrate for control of the sub-system. The microprocessor has the highest priority so it wins all arbitrations unless a DMA cycle is in progress, and in that event, the DMA cycle is temporarily given highest priority. Once the microprocessor has gained control, the sub-system control bus, address bus and data may be used to provide a status interrogation or a READ of the DMA RAM. When it gains control, the microprocessor operates the sub-system at a lower speed than does the DMA controller.

8 Claims, 10 Drawing Sheets

APPARATUS FOR ARBITRATING FOR A HIGH SPEED DIRECT MEMORY ACCESS BUS

BACKGROUND OF THE INVENTION

The present invention relates to an electronic data processing system, and more particularly to a method and apparatus for arbitrating for control of a high speed direct memory access (DMA) bus within the system.

Modern microprocessors are typically rich in data processing capabilities. They often have hundreds of instructions that instruct their respective systems to READ, WRITE, and process (logically and/or arithmetically) information. The instructions and the information are typically READ, WRITTEN and processed using data words ranging from one to 16 bytes in length. Because of this data word orientation, it is not surprising that microprocessors lack the capabilities to rapidly move large blocks of data words, such as would be necessary for file transfers from a SCSI input/output device which could involve 10 kilobytes or more of information.

In recognition of this inability to perform high speed block transfers, many microprocessor based systems are supplemented with DMA controllers to increase their overall data transfer rate. The DMA controller can transfer large blocks of data between memory (e,g, random access memory or RAM) and any device which uses blocks data (e,g. SCSI peripheral devices).

The DMA controller typically connects to the system memory via the processor address and data buses in the same manner that the microprocessor is connected to these buses. In such a configuration, the microprocessor and the DMA controller time share the control and use of these buses. But, having the DMA controller share control of the processor address and data buses with the microprocessor has led to some difficult problems. Many of these problems occur because control of the processor address and data buses is passed from the microprocessor to the DMA controller at the beginning of each DMA storage/retrieval transaction. The overhead time required to periodically transfer control of these buses from the microprocessor to the DMA controller is fairly large. So large, in fact, that it is a bottleneck to high speed peripheral sub-systems, such as a SCSI controller and a SCSI bus. To provide lower overhead times and prevent this bottleneck, some systems have added dedicated high speed DMA buses which connect to their system memories. But even in a system with a dedicated high speed DMA bus, the microprocessor is typically blocked from accessing either the dedicated DMA bus or the DMA sub-system devices associated with the dedicated DMA bus until the present DMA transaction is completed. This can be especially troublesome if the DMA controller is unable to successfully complete the present DMA transaction, as occasionally happens. In such a case, the DMA controller may wait for the transaction to be completed, but that completion never occurs. The system DMA controller is not sophisticated enough to time itself out (i.e. set a maximum time limit for a transaction and then terminate the transaction if the limit is exceeded), and the system microprocessor, which is sophisticated enough to time itself or the DMA controller out, is blocked from a normal access until the normal access is completed. Thus, there is a need in the art for a system having a microprocessor and a DMA controller wherein the microprocessor can rapidly access the DMA sub-system devices at virtually any time.

It is an object of this invention to provide a data processing system with a microprocessor, a DMA controller, and a high speed DMA memory bus, wherein the high speed DMA memory bus may be used by the microprocessor to check the status of any DMA device between DMA cycles of a DMA data transaction.

It is another object of this invention to provide a DMA controller for use in a system with a high speed DMA data bus which has an arbitration circuit such that the system microprocessor may arbitrate for access to the high speed address and data buses even during a current DMA cycle of a DMA transaction.

SUMMARY OF THE INVENTION

Briefly stated, in accordance with one aspect of the invention, the foregoing objects are achieved by providing an apparatus for an electronic data processing system. The system has a microprocessor, a processor address bus, a processor data bus, and a processor control bus connecting the microprocessor to a local ROM and a local RAM in a common system arrangement. The apparatus includes a DMA controller which controls a high speed input/output controller, which interfaces to an external high speed bus, to transfer data to a DMA RAM, which is separate from the local RAM. The apparatus also includes multiplexers and a gateway to provide the microprocessor access to the high speed input/output controller to perform supervisory control thereover and to the DMA RAM to instruct the DMA RAM to WRITE one or more data words through the gateway to other portions of the system. The DMA controller has default control of the high speed input/output controller and the DMA RAM, but the microprocessor also may control the high speed input/output controller and the DMA RAM and it has a higher priority than the DMA controller. Therefore, the apparatus has an arbitration circuit which allows the microprocessor to arbitrate for and quickly gain control of the high speed input/output controller, the DMA RAM, and the DMA data bus, unless a DMA cycle is currently in progress. If a DMA cycle is in progress, the arbitration circuit allows the DMA controller from inhibiting the microprocessor from gaining control until the DMA cycle is over. Thus, rapid access to the DMA sub-system is provided to the microprocessor for performing supervisory functions without the overhead of periodic microprocessor accesses to run status checks.

Various objects appear from the foregoing summary of the invention. Other objects and further scope of applicability of the present invention will appear from the following detailed description. It should be understood that the detailed description indicates one embodiment of the invention and is given by way of illustration only since changes and modifications may be made within the spirit and scope of the invention.

BRIEF DESCRIPTION OF THE DRAWINGS

While the specification concludes with the appended claims particularly pointing out and distinctly claiming the subject matter which is regarded as the invention, it is believed that the invention will be better understood from the following detailed description of the illustrative embodiment taken in conjunction with the accompanying drawings in which:

DESCRIPTION OF A PREFERRED EMBODIMENT

Figure 1A:
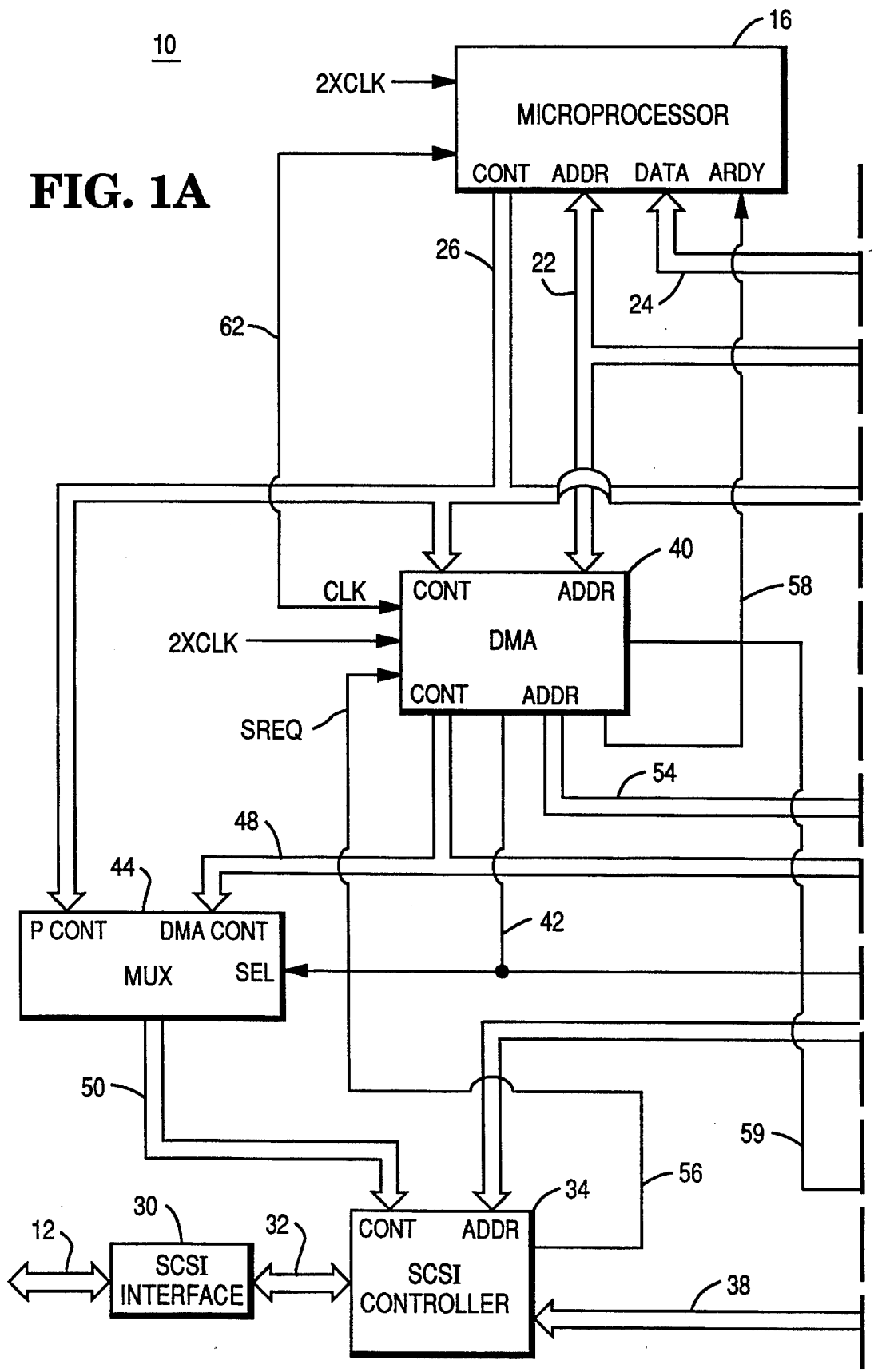
FIGS. 1A and 1B form a block diagram of a data interface which is in accordance with the present invention.
Figure 1B:
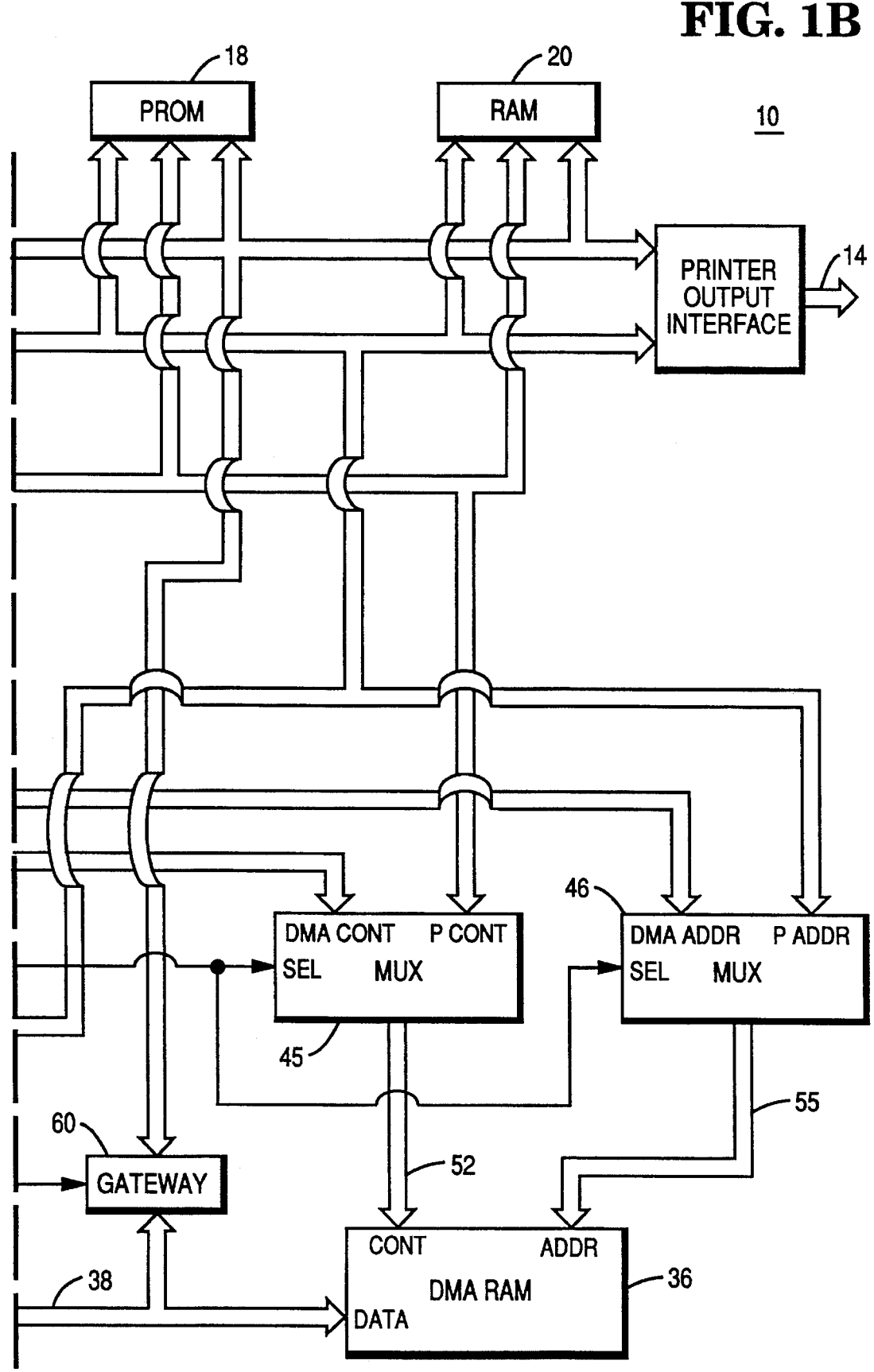

Referring to FIG. 1A and 1B, a functional block diagram of a data interface 10 is shown in accordance with present invention. The data interface 10 transfers data between a high speed parallel data bus 12, such as an ANSI X.3.131-1986 SCSI bus, to a parallel printer output bus 14, such as a bus for a printer having a Data Products Interface (DPI). A microprocessor 16 supervises the operation of the data interface 10 by following the instructions of a program that is stored in PROM 18 and in local RAM 20, if necessary. The microprocessor 16 is connected to the PROM 18 and the RAM 20 by an address bus 22, a data bus 24, and a control bus 26. The microprocessor 16 uses the address bus 22, the data bus 24 and the control bus 26 to control the flow of instructions and information throughout the data interface 10.

The SCSI bus 12 is connected to an external SCSI bus at one end and to a SCSI interface 30 at another end. The SCSI interface 30 provides an electrical interface to the SCSI bus 12 for the data interface 10. The SCSI interface 30 is connected by a high speed intermediate bus 32 to a SCSI controller 34, such as a type 53C90 manufactured by NCR Corporation, Dayton, Ohio. All of the lines of the high speed intermediate bus 32 are bi-directional; but, the control portion of the high speed intermediate bus 32 uses this bi-directionality the most. The SCSI controller 34 transmits control signals to the SCSI interface 30 via the control portion of the high speed intermediate bus 32 to instruct it to receive and transmit data from the SCSI bus 12, and to perform the protocol tasks necessary to properly interface with the SCSI bus 12. Similarly, the SCSI interface 30 transfers control signal received from the SCSI bus 12 to the SCSI controller 34 via the control portion of the high speed intermediate bus 32.

The SCSI bus 12 is a high speed parallel data bus by design. For this reason, the SCSI controller 34 receives a large volume of high speed parallel data via the data portion of the high speed intermediate bus 32. And, since the SCSI controller 34 does not have a large internal storage capacity, a high speed data output is provided to prevent a data build-up within the SCSI controller 34. A high speed direct memory access (DMA) RAM 36 is connected to the SCSI controller 34 via a high speed memory bus 38 in order to provide the storage capacity at the data storage rate that is required to prevent build-up of the data received from the SCSI bus 12.

A DMA controller 40 during a DMA cycle provides direct supervision and control of the transfer of data from the SCSI Controller 34 to the DMA RAM 36 via the high speed memory bus 38.

The DMA controller 40 controls a group of multiplexers 44, 45, and 46 by a select signal conducted by a select line 42 connected therebetween. The DMA controller 40 subsequently performs most of its DMA operations between the SCSI Controller 34, the DMA RAM 36, and the high speed memory bus 38 with the aid of the multiplexers 44, 45, and 46.

Multiplexer 44 has one of its inputs connected to the processor control bus 26. A second input of the multiplexer 44 is connected to a DMA control bus 48. The output of multiplexer 44 is connected via bus 50 to a control input port of the SCSI Controller 34. Multiplexer 45 similarly has one input connected to the processor control bus 26. A second input of the multiplexer 45 is also connected to the DMA control bus 48. The output of the multiplexer 45 is connected via bus 52 to DMA RAM 36. Multiplexer 46 has one of its inputs connected via bus 54 to an address output port of the DMA controller 40. A second input, of the multiplexer 46 is connected via the processor address bus 22 to the address output port of the microprocessor 16. The output of the multiplexer 46 is connected via bus 55 to the address input port of the DMA RAM 36.

The multiplexers 44, 45 and 46 operate as multiple pole, double throw switches which are controlled by the select signal that is conducted via the select line 42. The select signal usually switches the multiplexers 44, 45 and 46 to connect the control bus 48 and the address bus 54 of the DMA controller 40 and the control signals thereof to the SCSI Controller 34 and the DMA RAM 36. This is the default and, also, the DMA cycle condition of the multiplexers 44, 45, and 46.

With this arrangement of the multiplexers 44, 45 and 46, except when the microprocessor 16 is accessing the DMA RAM 36 or the SCSI Controller 34, the DMA controller 40 may initiate DMA cycles requested by the SCSI Controller 34 without any overhead delay and begin a DMA transaction between the SCSI Controller 34 and the DMA RAM 36 via the high speed memory bus 38. This DMA transaction may include one or more DMA cycles.

If the microprocessor 16 attempts to address the DMA RAM 36 or the SCSI Controller 34 while DMA cycles of a DMA data transaction are occurring, one of two results will occur. If a DMA cycle is in progress when the attempted access is made, the DMA controller 40 will respond by transmitting a NOT READY signal via a line 58 to the microprocessor 16. As soon as the current DMA cycle is over, the DMA controller 40 will switch the multiplexers 44, 45 and 46 to connect the processor address bus 22, the processor data bus 24, and the control bus 26 to the SCSI Controller 34, the DMA RAM 36 and the high speed memory bus 38. Also, the DMA controller will change the NOT READY signal on the line 58 to a READY signal in order to allow the microprocessor 16 access for a READ or WRITE cycle to the DMA RAM 36 or the SCSI. Controller 34. When the microprocessor access cycle is over, the DMA 40 will switch the multiplexers 44, 45, and 46 to the DMA cycle condition so the performance of DMA cycles may be resumed by the DMA controller 40 across the high speed memory bus 38 to complete the current transaction just as before the microprocessor access.

If the microprocessor 16 attempts to address the DMA RAM 36 or the SCSI Controller 34 while a DMA cycle is not in progress, then the multiplexers 44, 45, and 46 are switched by DMA controller 40 to allow the microprocessor 16 READ or WRITE access to the DMA RAM 36 or the SCSI Controller 38 without delay. If during a microprocessor READ or WRITE access cycle, the SCSI Controller 38 issues a request for a DMA cycle via a line 56, the requested DMA cycle is delayed until the microprocessor access is over.

Figure 2A:
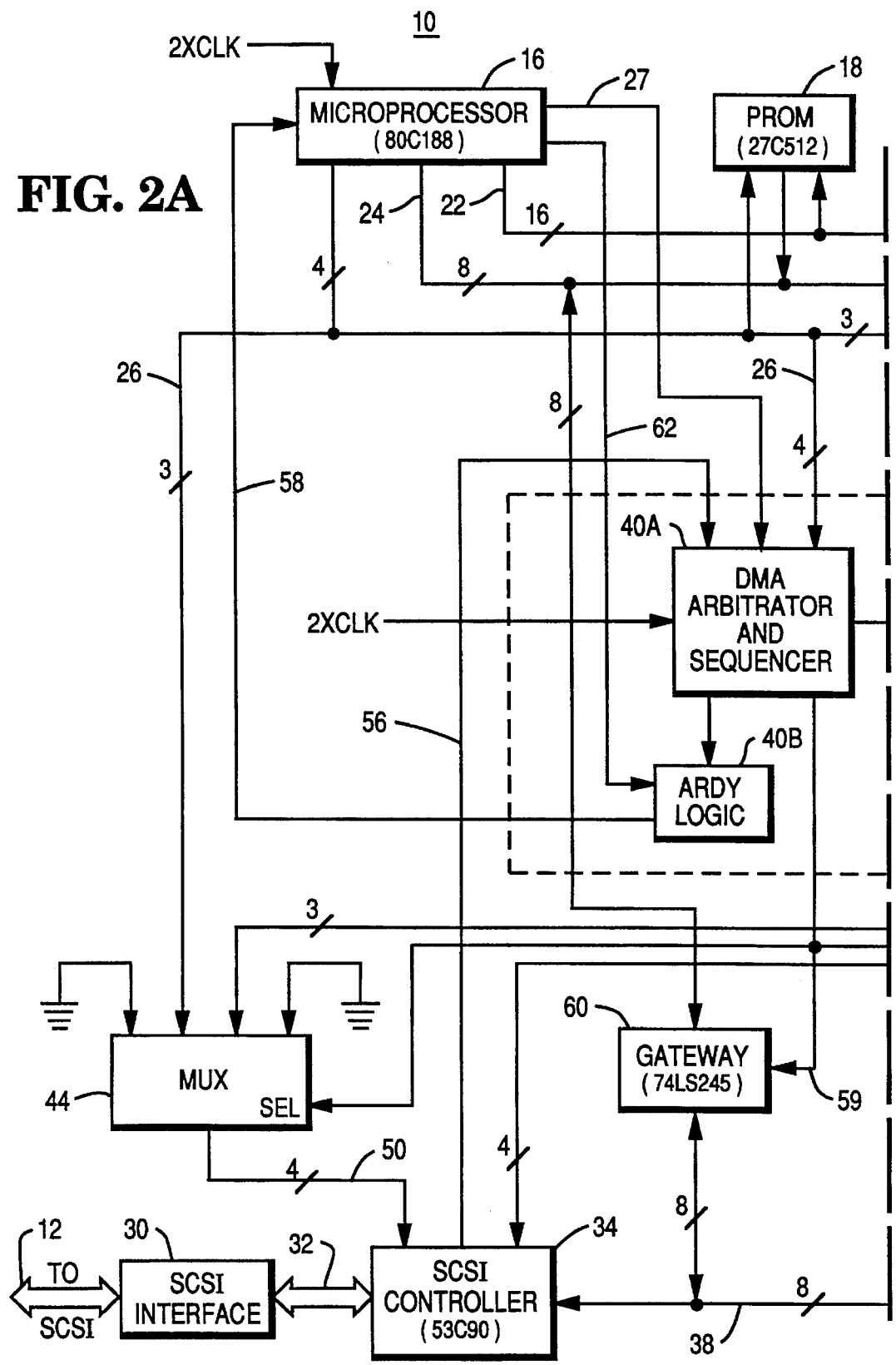
FIGS. 2A and 2B form a detailed block diagram of a SCSI-to-DPI printer interface which is accordance with the present invention.
Figure 2B:
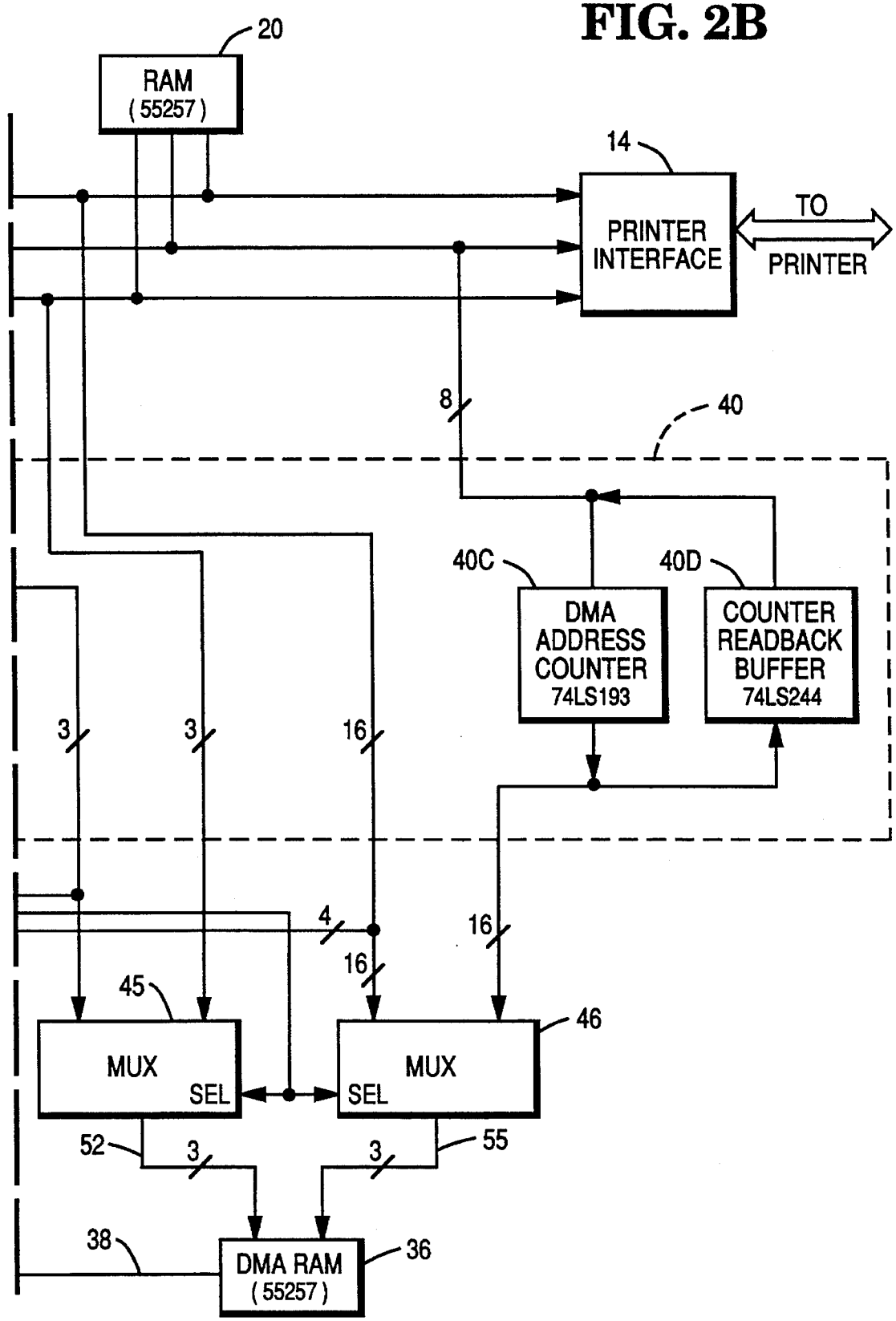

Referring now to FIGS. 2A and 2B, a specific embodiment of the data interface 10 embodying the invention will be described. In the shown embodiment, the printer interface 14 is a standard interface 14 for a DPI printer, which, as is well known, is a parallel interface. Similarly, the SCSI bus 12, the SCSI interface 30, the high speed intermediate bus 32, and the SCSI controller 34 (which is a type 53C90 or equivalent) are connected together in a standard arrangement.

The microprocessor 16 is a type 80C188 by Intel Corporation of Santa Clara, Calif. The PROM 18 is type 27C512 that is also available from Intel. The local RAM 20 is a type 55257 by Toshiba Corporation, Tokyo, Japan. The microprocessor 16, the PROM 18 and the local RAM 20 are connected to the processor address bus 22, the processor data bus 24, and the processor control bus 26 in a standard manner. The processor address bus 22 has sixteen lines (A0–A15), the processor data bus 24 has eight lines (D0–D7), and the processor control bus 26 has four lines: RD/, WR/, PCS0/, and MCS0/. The control lines are operated by the microprocessor 16 in response to a program instructions to control the reading and writing of data from other integrated circuit chips within the data interface 10 in response to the microprocessor address signals on processor address bus 22, and the peripheral chip-select signal PCS0/ and the memory chip select signal MCS0/on their respective control lines of the control bus 26. Additionally, a data transmit/receive signal DT/R is transmitted under program control from the microprocessor 16 via line 59 to control the connection or isolation of processor data bus 24 and the high speed memory data bus 38.

To achieve the maximum data transfer results, most of the DMA controller 40 is sequenced by a 25 megahertz clock, 2XCLK. The SCSI controller 34 is also operated by 2XCLK at 25 megahertz, which is near the upper limit of the current type 53C90 controllers. Further, the 2XCLK signal is inputted to the microprocessor 16 where it is internally divided to a 12.5 megahertz clock signal, CLK that is used as the microprocessor clock rate. The CLK signal is used internal to the microprocessor 16 for its sequencing, and is also outputted on line 62 for use by the ARDY control logic 40B within the DMA controller 40. The leading edge of the ARDY signal may be asynchronous with respect to the CLK signal, however a type 80C188 microprocessor requires that the trailing edge of the ARDY signal be synchronous with the CLK signal. Thus, the DMA controller 40, except for the ARDY logic 40B, operates at 25 megahertz to provide very fast data transfer and switching rates.

The DMA controller 40 is made up of four specific portions. A DMA Arbitrator and Sequencer 40A which provides arbitration for the control of the multiplexers 44 and 45, and sequencing for SCSI and DMA RAM control signals. An ARDY logic circuit 40B provides the an ARDY control signal which prevents the microprocessor 16 from directly controlling the data interface 10 during a DMA cycle. A DMA Address Counter 40C and a DMA Counter Readback Register 40D together keep track of the next available DMA RAM address where SCSI data may be stored and to iterate to the next DMA RAM available address after the present one has been written into, The DMA Address Counter 40C and the DMA Counter Readback Register 40D may be read and written to by the microprocessor 16 as a means of informing each other about the location of data to be transferred from the SCSI Controller 34 to the DMA RAM 36.

The DMA Arbitrator and Sequencer 40A has ALE, WR/, RD/, PCS0/, and MCS0/ signals from the microprocessor 16 on a control line 27 and the processor control bus 26 respectively. The other main input signals are the 2XCLK from an oscillator (not shown) and the DMA REQ signal from the SCSI Controller 34 on via line 56. When the SCSI Controller 34 transmits a DMA REQ signal, the DMA controller takes direct control of the SCSI Controller 34 and provides a high speed DMA transfer of data to the DMA RAM 36. The DMA Arbitrator and Sequencer 40A and the ARDY logic circuit 40B together provide the ARDY signal on line 58 which disables the microprocessor from controlling the SCSI Controller 34 and the DMA RAM 36. The DMA Arbitrator and Sequencer 40A generates a SCSI-DMA-RD/ signal, a SCSI-DMA-WR/ signal, and a SCSI-DACK/ signal from the DMA REQ signal and the 2 XCLK signal. These generated signals are connected via the multiplexer 44 to directly control the transfer of data between the SCSI Controller 34 and the DMA RAM 36. As previously mentioned, the addresses for these transfers are provided by the DMA Address Counter 40C.

Figure 3:
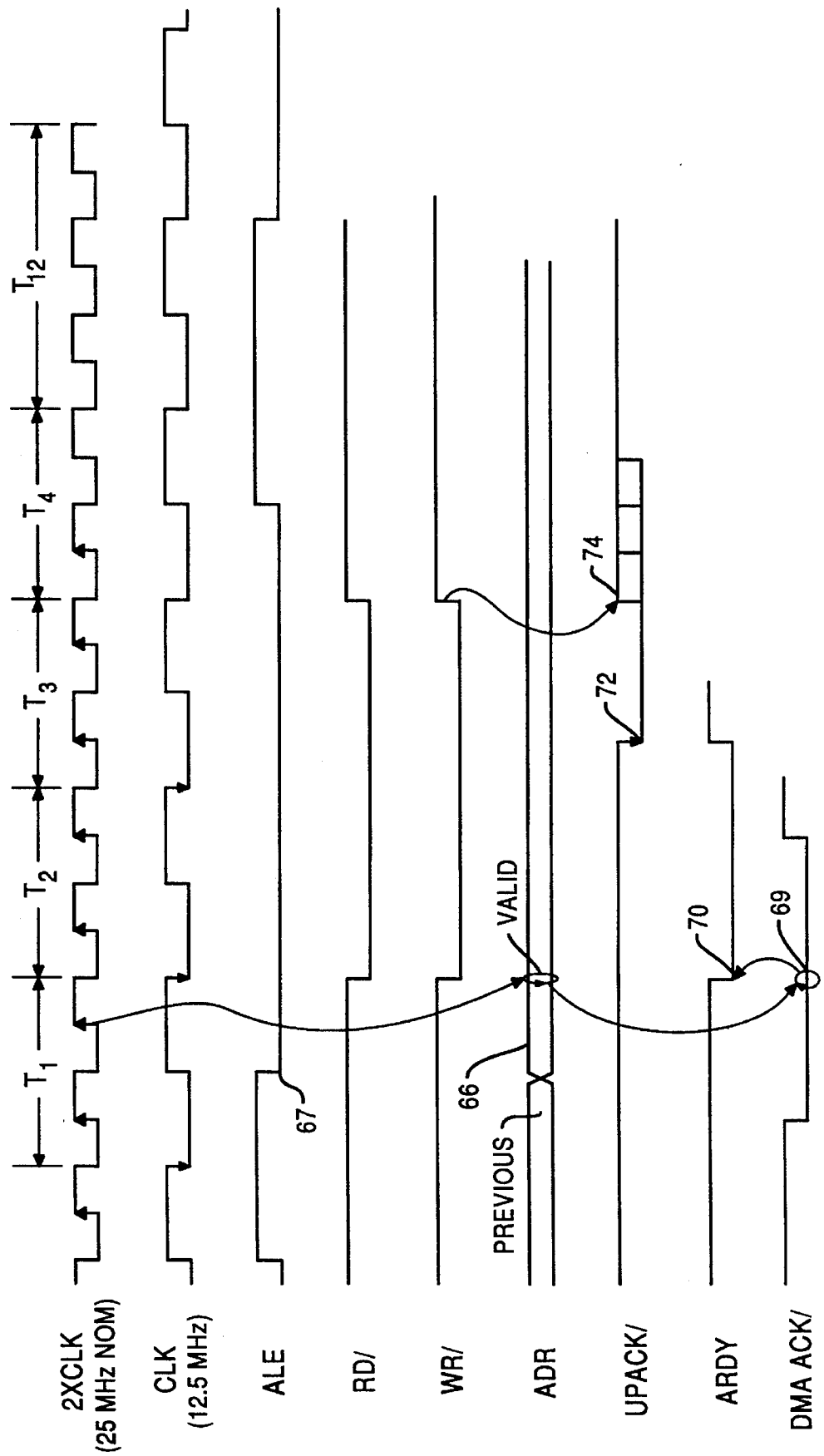
FIG. 3 is a timing diagram useful for understanding the present invention.
Figure 4A:
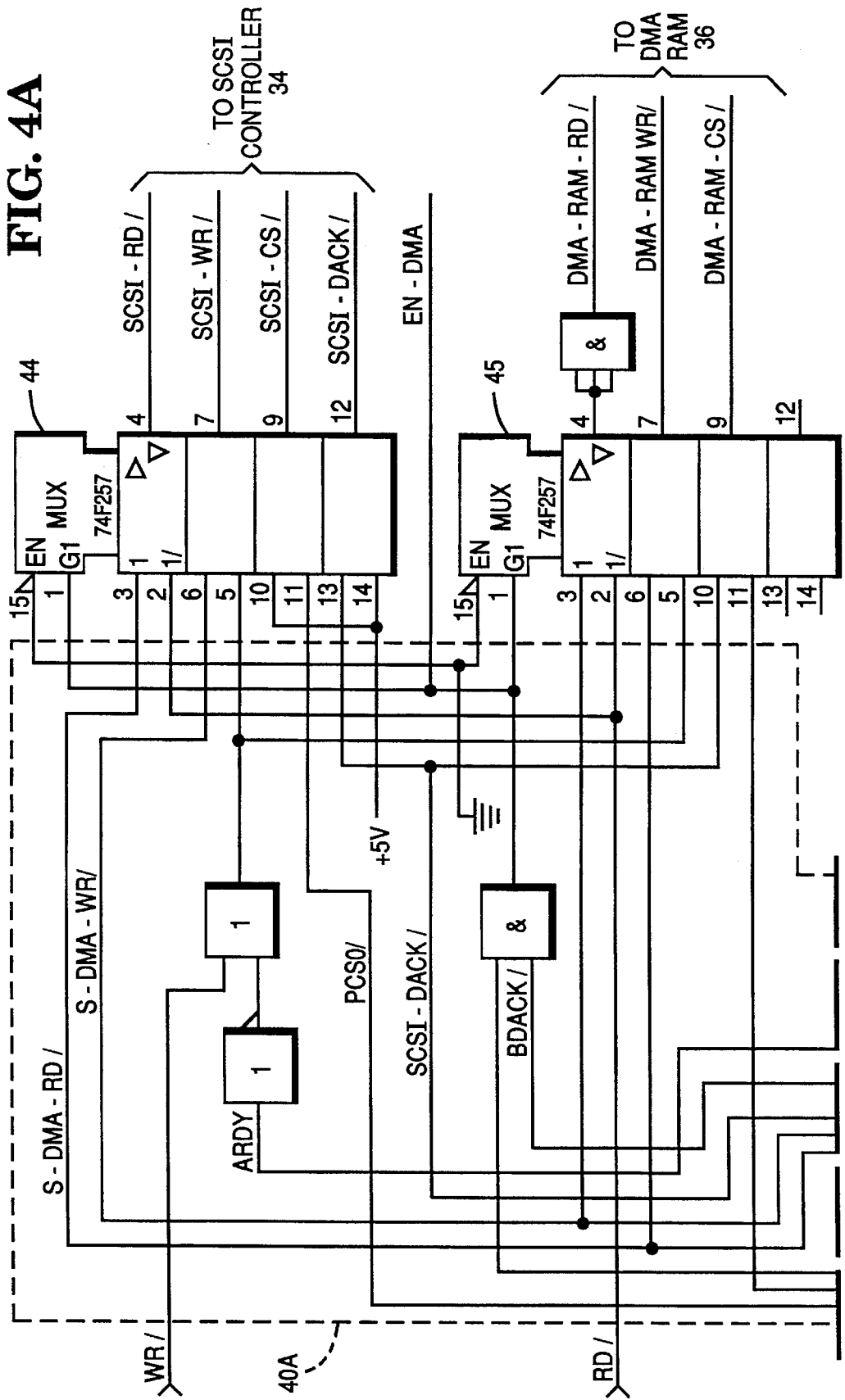
FIGS. 4A–4E when joined together according to FIG. 4, form a schematic diagram of a DMA controller and supporting circuits according to the present invention.
Figure 4B:
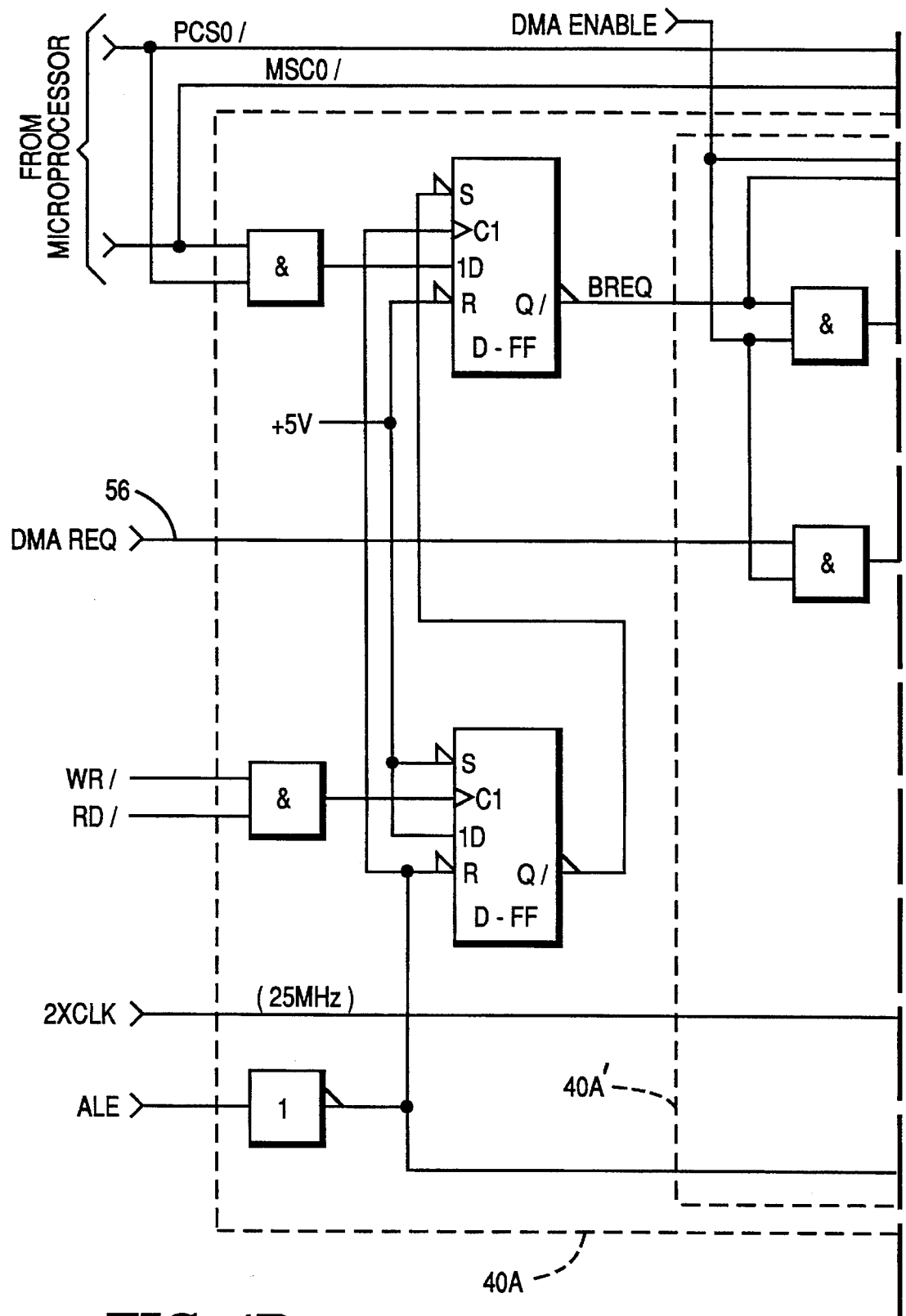
Figure 4C:
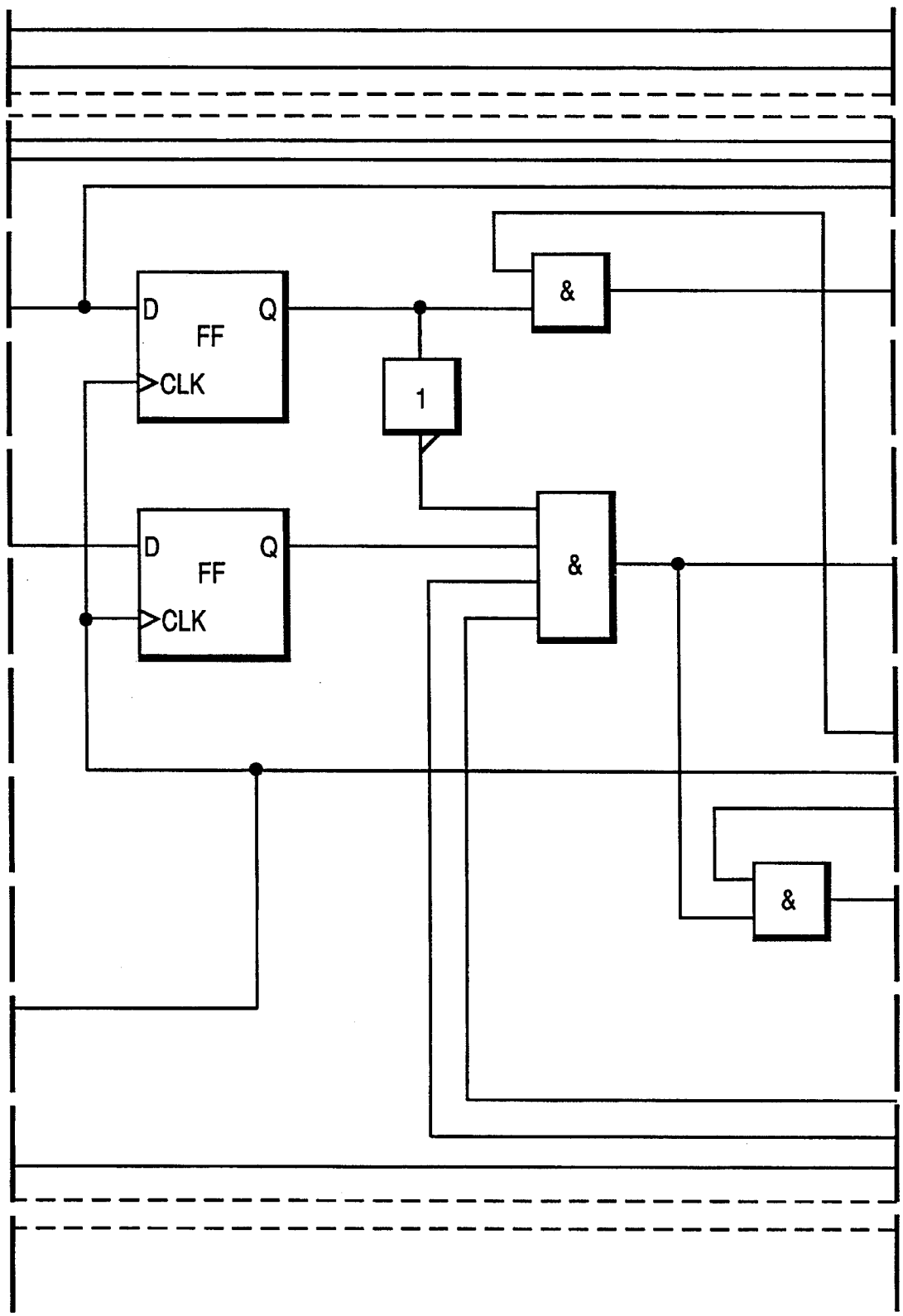
Figure 4D:
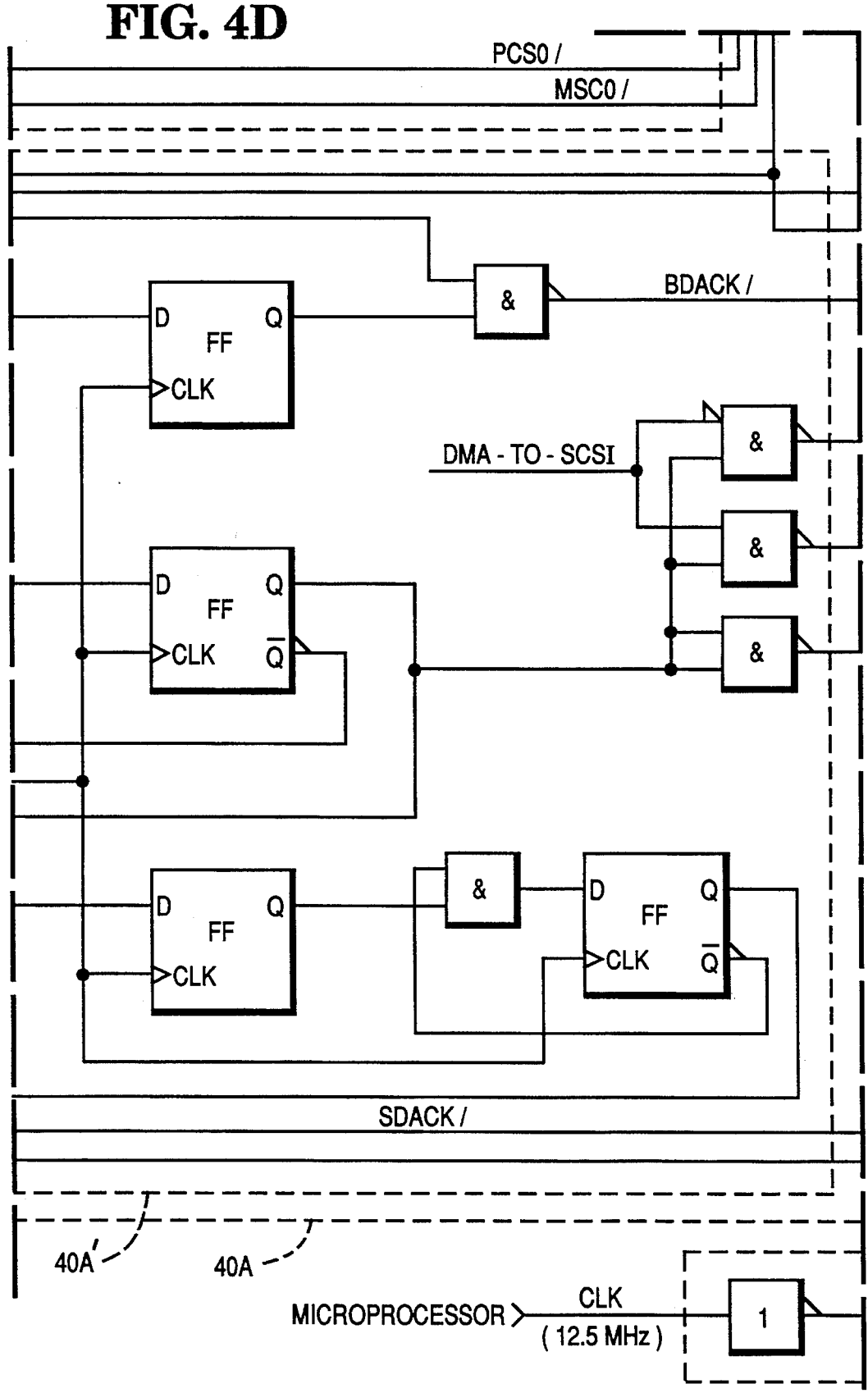
Figure 4E:
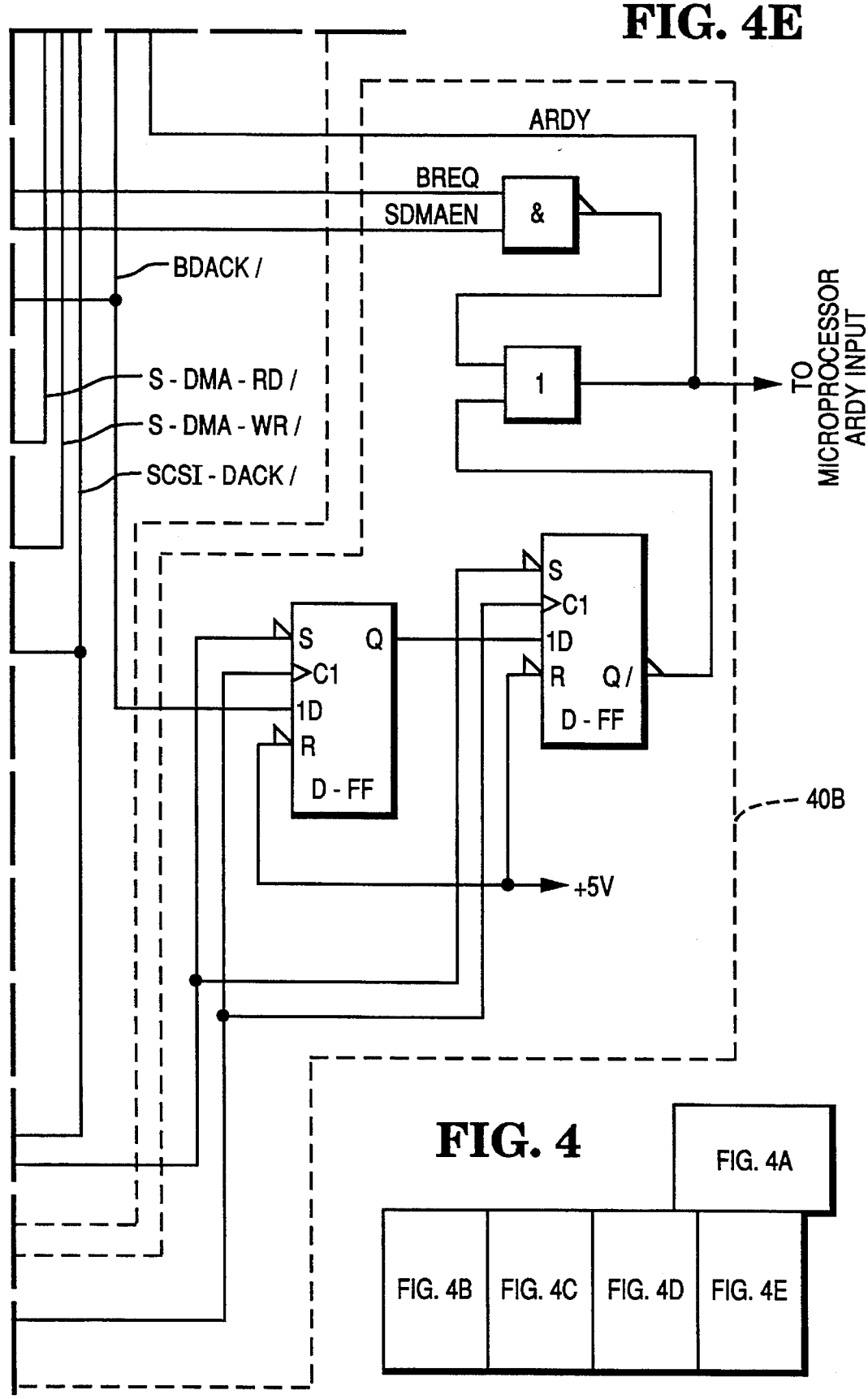
Figure 4:
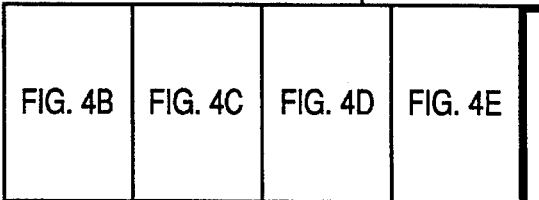
FIG. 4 is a general view of a DMA controller of the present invention.

Referring now to FIGS. 2A, 2B, and 3, the timing of the arbitration and multiplexer switching will be described. The microprocessor 16 attempts an access to the high speed memory bus 38 by driving an address 66 that corresponds to a location in the DMA RAM 36 or the SCSI Controller 34 and by driving ALE to logic LO 67. On the next rising edge of 2XCLK after it is initiated the address 66 is valid. Since this is an access to the DMA RAM 36 or the SCSI Controller 34, the DMA controller 40 tests to determine if a DMA cycle is currently in progress. If a DMA is currently in progress, the DMA controller 40 will transmit the ARDY line with a NOT READY signal, which will tell the microprocessor 16 that the access cannot be immediately completed. As soon as the current DMA cycle is over, or if a DMA cycle was not currently in progress as indicated by a logic level 67 on a SCSI-DACK/ line (shown in FIGS. 4A and 4E), the DMA controller 40 transmits the ARDY line with a READY signal 70, which allows the microprocessor 16 to take control of the high speed memory bus 38 and perform its access. As the DMA controller 40 transmits the READY signal 70, it also transmits an acknowledgement logic LO 72 on the uPACK/ line. The access shown in FIG. 3 is a WRITE access, and the completion of the transaction is marked with a logic HI 74 on uPACK/.

Referring now to FIGS. 4A–4E a logic diagram is shown of one embodiment of the DMA Arbitrator and Sequencer 40A shown enclosed within a dashed line, the ARDY logic circuit 40B shown enclosed by another dashed line, and some of the related circuitry. This logic diagram taken in conjunction with FIGS. 2A and 2B and this specification, provides one skilled in the art with all the information required to make and use the invention. Those skilled in the art will also recognize that much of the logic in the DMA Arbitrator and Sequencer 40A may be provided by a single programmable array logic chip, e.g. the circuit 40A' enclosed by the inner dashed lines. Alternatively, the circuit 40A' and the ARDY logic circuit 40B could be provided by a programmable gate array.

Thus, it will now be understood that there has been disclosed a method and apparatus for arbitrating for a high speed DMA bus which provides an extremely rapid switch from control by the DMA controller to control by the microprocessor. While the invention has been particularly illustrated and described with reference to a preferred embodiment thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. An apparatus for use in an electronic data processing system having a DMA controller, a DMA data bus, and a microprocessor that is connected to a processor address bus, a processor data bus and a processor control bus, comprising:

input/output means for receiving a data word from an external high speed bus, said input/output means having a buffer register to store the data word for subsequent transfer to the DMA data bus;

first multiplexer means for multiplexing control signals to the input/output means;

DMA RAM means connected to the DMA data bus for receiving and storing the data word;

second multiplexer means for multiplexing the control signals and address signals to the DMA RAM means;

gateway means for switchably connecting or disconnecting the processor data bus to said DMA data bus, said gateway means is responsive to a control signal from the DMA controller for either connecting or disconnecting the processor data bus from the DMA data bus;

said first multiplexer means has a first input connected to the processor control bus for receiving control signals from said microprocessor and a second input connected to a DMA control bus for receiving control signals from said DMA controller;

said second multiplexer means has a first input connected to the processor control bus, a second input connected to the processor address bus, a third input connected to the DMA control bus and a fourth input connected to a DMA address bus; and an arbitration circuit is included as a part of the DMA controller, the arbitration circuit having an arbitration control input connected to and controlled by said microprocessor, a select output connected to said first and second multiplexers, and a gateway control output connected to said gateway means;

if the microprocessor outputs a first arbitration signal to said arbitration circuit said arbitration circuit multiplexes said second input of said first multiplexer means and said third and fourth inputs of said second multiplexer means from the DMA controller to said input/output means for receiving a data word from an external high speed bus and said high speed RAM means respectively;

if the microprocessor outputs a second arbitration signal to said arbitration circuit said arbitration circuit multiplexes said first input of said first multiplexer means and said first and second inputs of said second multiplexer means from the microprocessor to said input/output means and said DMA RAM means respectively, and switches said gateway means to connect said DMA data bus to said processor data bus.

2. The invention as set forth in claim 1, further comprising means for delaying a WRITE control signal from said microprocessor relative to signals on said processor address bus and the other signals on said processor control bus to said DMA input/output controller and said DMA RAM, to allow the multiplexed and switched signals to settle before a WRITE operation begins.

3. The invention as set forth in claim 2, further comprising:

means for determining if a DMA cycle is in progress; and means responsive to said determining means for inhibiting said arbitration circuit from multiplexing said first input of said first multiplexer means and said first and second inputs of said second multiplexer means from the microprocessor to said input/output means and said DMA RAM means respectively, and for switching said gateway to connect said DMA data bus to said processor data bus if the microprocessor outputs a second arbitration signal to said arbitration circuit and a DMA cycle is in progress.

4. The invention as set forth in claim 3, wherein said input/output means is a small computer system interface (SCSI) controller that is connected to an external small computer system interface (SCSI) bus.

5. The invention as set forth in claim 3, wherein a first data transfer rate for a DMA controlled data transfer on a per word basis is greater than a second data transfer rate for a microprocessor controlled data transfer.

6. The invention as set forth in claim 3, wherein a first clock rate of the DMA controller is greater than a second clock rate of the microprocessor.

7. The invention as set forth in claim 6, wherein said first clock rate is approximately twice said second clock rate.

8. The invention as set forth in claim 7, wherein said first clock rate is 25 megahertz and said second clock rate is 12.5 megahertz.

* * * * *